(No Model.)
F. F. LANDIS.
TRACTION WHEEL.
No. 263,342. Patented Aug. 29, 1882.
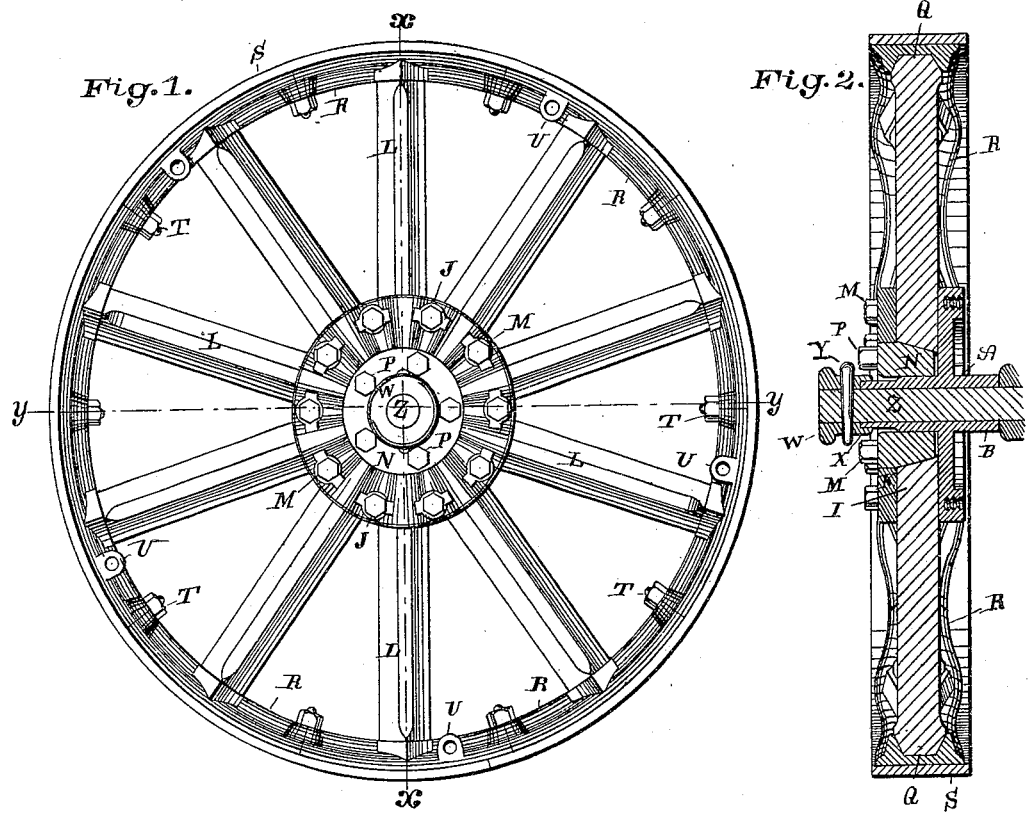
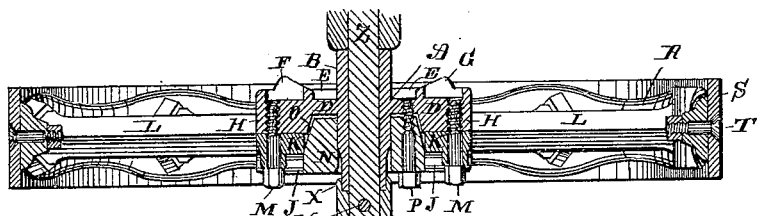
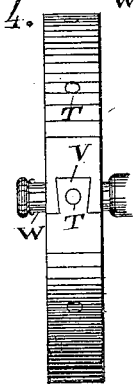
Attest:
Herm. Lauten
A. J. Henderson
Inventor:
F. F. Landis.
By H. A. Abbot.
Attorney

UNITED STATES PATENT OFFICE.

FRANK F. LANDIS, OF WAYNESBOROUGH, PENNSYLVANIA.

TRACTION-WHEEL.

SPECIFICATION forming part of Letters Patent No. 263,342, dated August 29, 1882.

Application filed December 10, 1881. (No model.)

*To all whom it may concern:*

Be it known that I, FRANK F. LANDIS, a citizen of the United States of America, residing at Waynesborough, in the county of Franklin and State of Pennsylvania, have invented certain new and useful Improvements in Wheels for Traction-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a side elevation. Fig. 2 is a section taken on the line *x x* through the spokes. Fig. 3 is a section taken on the line *y y* between the spokes; and Fig. 4 is on a smaller scale, showing the dovetail fastening of the ends of the metal tire.

The object of my invention is to produce a device by means of which the tire can be kept "tight" at all times by forcing the spokes outward from the hub; and it consists in the construction and arrangement of parts, as will be hereinafter more fully set forth.

In the accompanying drawings, A represents the hub, which is turned down and dressed at B to receive a gear-wheel the hub of which fits up close to a circular plate or flange, D, that preferably forms a part of the same piece of metal as the hub, but that may be a separate piece of metal properly secured to the hub. The plate D may extend outward from the hub any required distance, and may be cast or otherwise formed with the side next the gear-wheel provided with a flange, E, and pockets F and G; or these may be omitted, when desired. The side next the spokes is cast with projections H, the intermediate spaces forming one side of sockets I. A circular plate, J, with an open center is cast with projections K, shaped to meet the projections H of the plate D and form both sides of the socket I, through which the spokes L extend a suitable distance. The plate J is held in its place by bolts M, between the spokes, passing through the two projections H and K. The bottoms of the sockets I are formed by a thimble or circular wedge, N, that passes over the outer end of the hub and through the open center of the plate J into the cavity O provided for it around the hub and center of the plate D, to which it is secured by a series of bolts, P. The ends of the spokes are beveled or otherwise shaped to fit against the inclined surface of the wedge. The outer ends of the spokes are set in sockets Q, situated in the centers of fellies R, which are secured to the tire S of the wheel by tire-bolts T, passing through the tire and fellies at the point where two fellies meet, and secured by a nut on the inside of the fellies. The fellies of each wheel are also provided with a series of re-enforcements, U, provided with eyes, by means of which suitable frictional devices may be secured to the outside of the tire.

The tire S may be constructed in any suitable manner; but I prefer a single band of iron with one end terminating in a flaring tenon and the other in a mortise with receding sides, so as to form a dovetail fastening for the ends, as shown at V in Fig. 4 of the drawings.

In constructing this device the wedge or thimble N and the spokes should be so proportioned that the wedge will not be forced to the bottom of the cavity when the wheel is tightened up in the first instance, but room should be left below the wedge so that it may be forced in against the ends of the spokes and force them out against the fellies in case they loosen during use. When properly constructed the wedge should find a good even bearing-surface against the hub, the side of the open center of the plate J, and the ends of the spokes, and should be held rigidly against them by the series of bolts M. A cap, W, with a flange, X, fitting over the end of the hub, is held against the end of the hub, forming its end bearing by a linchpin, Y.

It is manifest that the wedge N may be so constructed as to surround the axle Z without the interposition of the hub, the hub being shortened for the purpose and held to the wedge by suitable bolts; but this would be but a modification of my invention.

Having thus described my invention, I claim as new and desire to secure by Letters Patent of the United States—

In a wheel for traction-engines, a hub having inner and outer plates around it, said plates being fastened together by screws, said screws running through flanges on the inner and outer plates, which flanges form sockets for the reception of the spokes of the wheel, the outer flange having a hollow center, in which and around the hub fits a circular wedge, held in place by screws which run through said wedge and screw into the inner plate, the position of said wedge being regulated by tightening or loosening the screws connecting it with the inner plate, the sides of said wedge resting against the ends of the spokes, said spokes being forced out against the fellies or tire by the pressure of the wedge on the ends of the spokes when the screws are tightened, substantially as and for the purpose described.

In testimony whereof I affix my signature in presence of two witnesses.

FRANK F. LANDIS.

Witnesses:
A. D. MORGANTHALL,
J. J. OLLER.